US009328023B2

United States Patent
Rosenthal et al.

(10) Patent No.: US 9,328,023 B2
(45) Date of Patent: May 3, 2016

(54) LOW WATER DRYING TYPE JOINT COMPOUND

(71) Applicant: United States Gypsum Company, Chicago, IL (US)

(72) Inventors: Guy Rosenthal, Wheaton, IL (US); Salvatore Immordino, Trevor, WI (US); Robert H. Negri, Lake Villa, IL (US); Richard B. Stevens, Village of Lakewood, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 0 days.

(21) Appl. No.: 13/647,796

(22) Filed: Oct. 9, 2012

(65) Prior Publication Data

US 2014/0100309 A1 Apr. 10, 2014

(51) Int. Cl.
| | |
|---|---|
| *C08L 1/00* | (2006.01) |
| *B32B 3/26* | (2006.01) |
| *C08L 1/26* | (2006.01) |
| *C09D 101/26* | (2006.01) |
| *C04B 9/04* | (2006.01) |
| *C04B 11/00* | (2006.01) |
| *C04B 28/14* | (2006.01) |
| *C04B 26/04* | (2006.01) |
| *C04B 111/00* | (2006.01) |

(52) U.S. Cl.
CPC ....... *C04B 26/04* (2013.01); *C04B 2111/00681* (2013.01)

(58) Field of Classification Search
CPC ....... C09D 131/04; C09D 101/02; C08K 3/22
USPC ............... 524/35, 563, 436; 106/197.01, 772, 106/778; 428/312.4
See application file for complete search history.

(56) References Cited

U.S. PATENT DOCUMENTS

| | | | |
|---|---|---|---|
| 4,391,647 | A | 7/1983 | Deer et al. |
| 4,661,161 | A | 4/1987 | Jakacki et al. |
| 5,112,400 | A * | 5/1992 | Nae et al. ................ 106/197.01 |
| 5,653,797 | A | 8/1997 | Patel |
| 5,779,786 | A | 7/1998 | Patel |
| 6,406,537 | B1 | 6/2002 | Immordino |
| 6,476,099 | B1 | 11/2002 | Cimaglio et al. |
| 6,545,066 | B1 | 4/2003 | Immordino, Jr. et al. |
| 6,673,144 | B2 | 1/2004 | Immordino, Jr. et al. |
| 6,805,741 | B1 | 10/2004 | Liu et al. |
| 7,374,611 | B2 | 5/2008 | Lettkeman et al. |
| 7,754,006 | B2 | 7/2010 | Liu et al. |
| 2006/0048684 | A1 * | 3/2006 | Bonetto et al. ................ 106/772 |

FOREIGN PATENT DOCUMENTS

| | | |
|---|---|---|
| GB | 1265804 | 3/1972 |
| WO | 0034200 | 6/2000 |
| WO | WO 00/34200 | * 6/2000 |

OTHER PUBLICATIONS

Martin Marietta Magnesia Specialities: "Wastewater & Water Treatment", Dec. 31, 2010 http://www.magnesiaspecialties.com/wtrbroch.htm.*
International Search Report prepared by the European Patent Office, for co-pending International Application No. PCT/US2013/060581, mailed Feb. 6, 2014.
Martin Marietta Magnesiia Specialties: "Wastewater & Water Treatment," dated Dec. 31, 2010, retrieved from the Internet at http://www.magnesiaspecialties.com/wtrbroch.htm.

* cited by examiner

*Primary Examiner* — Ling Choi
*Assistant Examiner* — Ronald Grinsted
(74) *Attorney, Agent, or Firm* — Greer, Burns & Crain, Ltd.; Pradip Sahu; Philip T. Petti

(57) ABSTRACT

A drying type joint compound composition is provided, including: at least one binder, a filler and water, the water having a weight percentage in the range of 12-18% of the total weight of the composition.

8 Claims, No Drawings

LOW WATER DRYING TYPE JOINT COMPOUND

BACKGROUND

The present invention relates to a composition for a joint compound for use in filling and coating joints between adjacent panels of gypsum wallboard. More specifically, the present invention relates to compositions of drying type joint compound having reduced water content for decreasing shipping costs.

In the construction of buildings, one of the most common elements is gypsum wallboard, often known as drywall, used in the construction of walls and/or ceilings. Walls made from gypsum wallboard are traditionally constructed by affixing the panels to wood studs or metal framing, and treating the joints between adjoining panels with a specially prepared adhesive called a joint compound. The side edges of the drywall panels are tapered, thus allowing the joint compound to be applied to the seam, between adjoining panels, in such a way that a monolithic surface is created when finished. This process generally proceeds by placing a taping joint compound within the joint formed by the abutted edges of the wallboards, and embedding a liquid-permeable paper or fiberglass tape within that compound. When dry (or set), a second coating referred to as a topping joint compound is applied over the joint, which may be subsequently lightly sanded upon drying. A third or finish coat is applied, allowed to dry, and lightly sanded to create a smooth monolithic surface that conceals any indication of where the drywall seams were. Another type of joint compound is an all-purpose grade that may be used for both embedding the joint tape and for applying the finish coats. A patterned or textured effect may be given to the finished wall and joint through the use of special application tools.

There are several categories of joint compounds. Drying type compounds harden through the evaporation of water, whereas setting type joint compounds chemically react with water during the curing process. Setting type joint compounds typically use calcium sulfate hemihydrate, also known as stucco or plaster of Paris, as a base. When water is added to the setting type powder, it reacts with the calcium sulfate hemihydrate via a hydration reaction to form an interlocking matrix of calcium sulfate dihydrate crystals. The interlocking crystal matrix gives the compound increased strength. The benefit of a setting type joint compound over a drying type is the overall strength of the finished joint, resulting in less shrinking and cracking, as well as an independence from having to wait for the joint compound to be completely dry prior to further finishing. Drying type joint compounds have the advantage of ease of use, as they typically come in a ready mixed form, with water being added and mixed by the manufacturer. A third type of joint compound combines the setting action of a calcium sulfate hemihydrate based compound with the ease of use of a ready mixed compound.

The present composition is concerned with drying type joint compounds. Suitable examples of such compounds are disclosed in U.S. Pat. Nos. 6,476,099 and 6,545,066, both of which are incorporated by reference. These products are provided in buckets or tubs in a consistency that is immediately usable by the user ("ready mixed"). At present, conventional weight ready mixed joint compounds having weights greater than 12 lbs/gallon (1437.917 kg/m3) contain approximately 30-40% water by weight, and as much as 50% by volume. As the conventional weight or density of the composition decreases, there is actually more water by weight in the composition. The '099 patent discloses a composition having water as 32% of the weight, and the '066 patent discloses a composition having water as 40% of the weight. While these ready mixed joint compounds have gained wide acceptance due to their convenience of use relative to bagged, powdered products, and they can be used in manufactured form in some applications, water is added by the user at the jobsite in almost all cases. This jobsite addition of water to the ready mixed joint compound is largely due to the preference by professional applicators, of a relatively low viscosity joint compound that is easily spread in thin coats that dry relatively quickly.

However, the relatively heavier composition in ready mix format, compared with dry, bagged joint compound increases the shipping costs for a given sample of joint compound, where the ready mix type is typically provided in one or five gallon containers such as buckets or pails. Due to an increased focus on environmentally friendly technologies, there is a motivation in the industry to reduce the amount of energy expended in the joint compound production and distribution supply chain.

SUMMARY

The above-identified need is met by providing a drying type joint compound composition in which a significant portion of the water has been removed for reducing shipping costs. At the jobsite, the user adds water as needed to obtain the desired consistency or viscosity. Since users customarily add water anyway to existing ready mix joint compound products, the present composition does not appreciably add to the user's preparation steps, but provides a composition which is lighter weight and thus less costly to ship to the jobsite or to local retail outlets. An advantage of the present compound over both conventional ready mix joint compounds and totally dry, bagged compounds, is that the slightly moist, granular consistency of the dewatered joint compound readily disperses in water at the jobsite with conventional mixing, and at the same time reduces the amount of dust generated during the jobsite watering and mixing process. Thus, a composition is provided that is lightweight compared to conventional ready mix joint compounds, and at the same time is readily dispersed in water at the jobsite with a relatively low level of dust generated during the rewatering process, compared with conventional totally dry bagged joint compound formulations.

An unexpected discovery occurring in the development of the present composition, is that the mixability at the jobsite is enhanced over a preferred, relatively narrow range of water amounts that results in a granular consistency of the mixture upon initial formulation. It has been found that using the preferred range of water, which is considerably lower than the range that would be employed in preparing a conventional, ready to use, ready mixed joint compound, reduces clumping and balling of the material during initial formulation. Consequently, at the jobsite, the present granular composition mixes or disperses more evenly when rewatered and subject to powered mixing as is customary in the art. In a preferred embodiment, the present composition features a reduction of percentage water by weight, in the range of 40 to 50%, compared to conventional drying type ready mix joint compounds.

More specifically, a drying type joint compound composition is provided, including at least one binder, a filler and water, the water having a weight percentage in the range of 12-18% of the total weight of the composition. It should be noted that the amount of water is less important than the distinctive, moist, granular consistency of the mixture at formulation, which is achievable using a variety of compositions. The amount of water necessary to achieve optimal consistency will vary depending upon the other components: for example, fillers with larger average particle size do not require as much water to achieve the same, preferred consistency as fillers with smaller particles, due to the difference in surface area.

In another embodiment, a drying type joint compound composition is provided, including at least one binder, a filler and water, upon formulation approximately 75-95% of the composition passing a No. 4 screen.

DETAILED DESCRIPTION

In the present composition, the main requirement is a "drying type" joint compound composition, which is well known in the art, and examples of which are incorporated by reference above, including, among others, the compositions disclosed in U.S. Pat. Nos. 6,476,099 and 6,545,066. The particular formulation of the present drying type joint compound is not considered critical, as long as the amount of water by weight in the composition is approximately 12-18%, which is also approximately 50-75% less than conventional joint compounds of this type.

A drying type joint compound is preferred over a setting type, also known in the art, because a setting type compound in the form of a chemically retarded slurry requires the addition of an accurately measured chemical accelerator for use as a joint compound. Also, once the accelerator is added to the slurry, or once water is added to a dry powder, the setting type compound can only be used in a short time window before setting/hardening, after which it cannot be remixed. In contrast, the present composition, even if water has been added, can be used days later if it is sealed and not allowed to dry, as is the case with any drying type joint compound.

In general, the main component of the present drying type joint compound is a filler, preferably calcium carbonate. Other fillers, such as expanded perlite, magnesium carbonate, glass or resin microbeads are also suitable fillers, depending on the type of joint compound desired. In the present composition, a suitable filler is Dolocron 4512 a dolomitic limestone, manufactured by Specialty Minerals, Inc. The Chrysler Building, New York, N.Y. Calcium carbonate makes up approximately 65-80% by weight of the present composition. Dolomite is an equivalent product. Alternately, expanded perlite is preferred when a lightweight filler is desired. Often, several different fillers are used in combination to obtain a specific set of properties. In the present composition, another filler is Talcron or Montana talc, primarily magnesium silicate, manufactured by Barretts Inc, a subsidiary of Specialty Minerals, Inc. 8625 HWY 91 S. Dillon, Mont. 59725. This component improves crack and impact resistance and stiffness, is hydrophobic, and reduces moisture pickup. The talc makes up approximately 2-4% of the weight of the composition. However, other fillers are considered suitable, as is well known in the joint compound formulation art, and include, but are not limited to, mica, microbeads, etc.

In addition to the filler, the present joint compound generally includes one or more binders, one or more thickeners and other additives as required by the particular application to be used. Also, in some cases, ingredients such as attapulgite clay act as thickeners and fillers. Any conventional binder that is used in joint compounds is considered appropriate for the present composition. Binders that are particularly suitable include polyvinyl acetates, acrylics, polyvinyl alcohols, redispersible powders, such as polyvinyl acetate, ethylene vinyl acetates, and starches. Latex binders are also suitable. Examples of suitable latex emulsion binders include ethylene vinyl acetate copolymer latex or polyvinyl acetate latex. Combinations of binders are also contemplated.

In the present composition, an easily dispersible modified corn based starch polymer is used. In the present composition, the starch polymer is used as a thickener and binder, and is Starpol 136, sourced from Tate & Lyle, Decatur, Ill., and used at an approximate weight percent of 0.2. The starch is used in combination with a polyvinyl acetate (PVA) emulsion as a binder at an approximate weight percent of 1.8%. A preferred PVA is Halltech 41-830 provided by Halltech Inc. 465 Coronation Drive, Scarborough, Ontario, Canada The starch and PVA emulsion binders are preferably used in combination due to their respective properties and for reducing the cost of the composition.

Thickeners are optionally added to the joint compound to achieve a desired consistency. Cellulosic compounds, associative thickeners or starches are the preferred thickeners, with cellulosic thickeners being most preferred. In the present composition, a hydroxypropylmethyl cellulose (HMPC) with delayed solubility is used. A cold water dispersible cellulose ether, HMPC is used as a thickener, imparts good water demand, tape bond, crack resistance and workability, and enhances water retention. A preferred HPMC is Methocel 240S, sourced from Dow Chemical Co., Midland, Mich. 48674. Another thickener and suspending agent is a water soluble hydroxyethylcellulose (HEC) and is used at 0.04% and preferably between 0.02-0.05% of the weight of the composition. A preferred HEC is Natrosol 250HXR, provided by Ashland, Inc., Other conventional cellulosic thickeners, such as ethylhydroxy ethylcellulose, and methylhydoxypropyl cellulose, are also suitable in the present joint compound. The amount of cellulosic thickener ranges from about 0.02% to about 2% of the total weight of the total joint compound ingredients.

Preservatives are optionally added to ready-mix formulations to prevent bacteria and fungi from attacking the organic components over a period of time. In the present composition, the preferred amount of preservative is approximately 0.08% by weight. Preservatives are used in minor amounts, generally ranging from about 0.05 to about 0.15% of the total weight. A suitable preservative is Nuosept 91, supplied by ISP, 1361 Alps Road, Wayne, N.J. 07470.

Finally, suspending agents are preferably included to keep the heavier components of the composition from settling out. Clays, such as bentonite, kaolin, sepeolite or attapulgite clay are particularly preferred suspending agents, with attapulgite clay especially preferred. Attapulgite clay is used as a filler and thickener, forming a gel upon absorption of water in amounts ranging from 1.0 to 2.5% of the total weight, and more preferably approximately 2.0%. Gel B is a commercial formulation of attapulgite clay, provided by Advanced Minerals, International, LLC, Hunt Valley, Md. 21030 under the brand MIN-U-GEL.

Magnesium hydroxide is also used for maintaining pH levels of the resulting joint compound in the base range of at least 9, even when acidic water is used. A preferred source of Magnesium hydroxide is, is sourced from Martin Marietta Magnesia Specialties, LLC, Baltimore, Md.

Water is added to the present joint compound at the time of manufacture to provide a composition that reduces the amount of dust generated while mixing, while at the same time creating a granular consistency that promotes dispersion in water at the jobsite. An important feature of the present composition is that the amount of water added at the time of manufacture to achieve the above-identified objective is substantially less than conventional drying type joint compounds. More specifically, the amount of water in the present composition, preferably making up approximately 12-18% of the weight of the composition, is reduced approximately 50-75% compared to conventional drying type ready mix joint compounds as a percentage of weight of the composition.

mate maximum water percent by weight of 18% provide the desired beneficial results. When all the batches were mixed with a hand mixer the next day, the appearance and feel were identical. The compositions were prepared as follows, with the units displayed in grams:

TABLE 1

|  | A | | B | | C | | D | |
| --- | --- | --- | --- | --- | --- | --- | --- | --- |
|  | weight (g) | % | weight (g) | % | weight (g) | % | weight (g) | % |
| Calcium carbonate | 1000 | 60.8% | 1000 | 79.8% | 1000 | 76.7% | 1000 | 73.9% |
| talc | 41.1 | 2.5% | 41.1 | 3.3% | 41.1 | 3.2% | 41.1 | 3.0% |
| HMPC thickener | 5.6 | 0.3% | 5.6 | 0.4% | 5.6 | 0.4% | 5.6 | 0.4% |
| HEC thickener | 0.6 | 0.04% | 0.6 | 0.05% | 0.6 | 0.05% | 0.6 | 0.04% |
| attapulgite clay | 27.2 | 1.7% | 27.2 | 2.2% | 27.2 | 2.1% | 27.2 | 2.0% |
| starch | 2.8 | 0.2% | 2.8 | 0.2% | 2.8 | 0.2% | 2.8 | 0.2% |
| magnesium hydroxide | 0.8 | 0.05% | 0.8 | 0.06% | 0.8 | 0.06% | 0.8 | 0.06% |
| PVA emulsion | 24.5 | 1.5% | 24.5 | 2.0% | 24.5 | 1.9% | 24.5 | 1.8% |
| preservative | 1.1 | 0.1% | 1.1 | 0.1% | 1.1 | 0.1% | 1.1 | 0.1% |
| water | 540 | 32.9% | 150 | 12.0% | 200 | 15.3% | 250 | 18.5% |

Manufacture of the ready mixed joint compound includes combining of wet with dry components in a mixer. After the wet ingredients have been combined, for example PVA plus water, the dry components are mixed in with the wet components in the mixer. Mixing continues until a homogeneous mixture having the desired moist, granular consistency is obtained.

In this embodiment, trials were conducted for testing the manipulability of compositions as a function of the amount of water. The ingredients in all trials were combined and mixed for 90 seconds. Composition A is the control, and resulted in a conventional ready-mixed drying type joint compound with a viscosity of approximately 450 Brabender Units. Compositions B and C, representing formulations of the present composition, formed a moist, crumbly, granular mixture that had very little tack, but would hold together if formed and pressed by hand. When mixed in a Hobart N-50 5-quart mixer at low speed (agitator speed 136 RPM, attachment speed 60 RPM) with a flat beater agitator, this mixture retained the same granular consistency for the full 90 seconds of mixing, and 75-95% of the resulting mixture passed though a #4 sieve with minimal agitation. Composition D, having a greater weight percentage of water, when mixed under the same conditions as B and C, agglomerated after approximately 30 seconds into a monolithic mass approximately 5 inches in diameter, with the consistency of modeling clay, that held together and did not stick to the sides of the mixing bowl, although the ball was tacky to the touch. This mass could not pass though a #4 sieve, and as described in further detail below, is considered undesirable for use in conventional jobsite applications for wallboard joint compound, since the mass does not readily disperse in water.

After 6 days, there was no apparent change in any of the batches, and water was added to compositions B, C and D to match the water originally added to the control A batch. Compositions B and C were relatively easily combined with water in the Hobart N-50 mixer to form somewhat lumpy mixes after 60 seconds of mixing that smoothed out over 2 hours as all components wetted out. Composition D, having 18.5% water, was difficult to combine with water, since the clay-like mass had low surface area and was difficult to break up. Considerable effort was necessary to break up the monolithic mass and disperse it in the added water before the Hobart N-50 mixer could efficiently combine the components. Thus, compositions as shown below having an approxi- Bond to joint compound was measured according to ASTM-C474 after 24 hours at 75° F. (24° C.) and 50% relative humidity: Composition A was measured at 97% paper fiber tear; B was 92%; C was 95%; and D was 92%. Thus, the present compositions B and C provide comparable bond to paper joint tape as found in the control joint compound, the drawbacks of which are described above.

While a particular embodiment of the present low water drying type joint compound has been shown and described, it will be appreciated by those skilled in the art that changes and modifications may be made thereto without departing from the invention in its broader aspects and as set forth in the following claims.

What is claimed is:

1. A drying type joint compound composition concentrate, formulated for reduced shipping weight and said concentrate also being formulated for sufficient additional water being added by the user to said concentrate on the jobsite to create a usable joint compound, comprising: at least one binder, a filler having a weight percentage in the range of about 65-85%, and water, said water having a weight percentage in the range of 12-18% of the total weight of the composition, provided that the total liquid component of said concentrate is in the range about 14-20% of the total weight of the composition, and upon formulation approximately 75-95% of said composition passes through a #4 sieve for enhancing mixing of said concentrate with the additional water on the jobsite by the user as desired for creating a usable joint compound forming a mud-like spreadable material which can be applied to the wall surface.

2. The composition of claim 1, further including at least one thickener.

3. The composition of claim 2, wherein said at least one thickener is a cellulosic thickener.

4. The composition of claim 2, further including at least one preservative and at least one suspending agent.

5. The composition of claim 1, further including magnesium hydroxide for maintaining pH levels at approximately 9.

6. A drying type joint compound composition concentrate, comprising: at least one binder, a filler having a weight percentage in the range of about 65-85%, and water, said water having a weight percentage in the range of 12-18% of the total weight of the composition, said filler and water being present in a ratio of at least 4:1, provided that the total liquid component of said concentrate being in the range about 14-20% of the total weight of the composition and upon formulation approximately 75-95% of said composition passes through a #4 sieve, for enhanced on jobsite mixing, said concentrate composition is formulated such that in use on a jobsite additional water is added to said concentrate post formulation as desired by the user for creating an operational joint compound on the jobsite by the user, the compound having a viscosity of approximately 450 Brabender Units.

7. The composition of claim 1 wherein upon formulation, said concentrate has a moist, granular consistency.

8. The composition of claim 6 wherein upon formulation, said concentrate has a moist, granular consistency.

* * * * *